Patented Apr. 18, 1939

2,155,252

UNITED STATES PATENT OFFICE 2,155,252

CAUSTIC SOLUTIONS

Brazier K. Beecher, Barberton, and William F. Waldeck, Wadsworth, Ohio, assignors to Pittsburgh Plate Glass Company, a corporation of Pennsylvania No Drawing. Application January 2, 1937, Serial No. 118,924

1 Claim. (Cl. 23—184)

The present invention relates to methods of treating alkaline materials and it has particular relation to methods of treating aqueous solutions of the hydroxides of the alkali metals.

One object of the invention is to provide a simple and economical method of so treating solutions of the hydroxides of the alkali metals as to reduce or eliminate objectionable color which could not readily be removed by methods heretofore available.

This and other objects will be apparent from consideration of the following specification and the appended claim.

In such commercial methods of preparing solutions of the hydroxides of the alkali metals as that involving reaction of active lime and sodium carbonate in solution, the resulting solution initially contains 10–12 per cent NaOH. For commercial use this solution must be concentrated to at least 50 per cent NaOH. When such a dilute solution is evaporated to 50 per cent, the final liquor, after filtration, is usually of a greenish-yellow or a yellow-brown or an intermediate shade of color. While not affecting the quality of the caustic for most purposes, this color is objectionable to some users and such caustic is, therefore, under a commercial handicap.

It has now been found that the green color and the brown color are caused by two related substances, (probably manganese derivatives) differing only in degree of oxidation. The brown color is caused by a substance that apparently is in colloidal suspension because it can be absorbed and carried out of the solution by a variety of inert materials when finely divided and agitated with the solution. For instance, powdered alpha-cellulose may be agitated with the caustic solution and filtered. The caustic filtrate has a deep color because of organic matter leached from the cellulose. When this color is destroyed by oxidation, the original brown color is seen to have been destroyed, leaving a pale yellow-green residual color. Alternatively, alkaline-earth compounds may be added to the caustic solution and the resulting finely divided alkaline-earth precipitate may be removed by filtration. By this treatment the brown color is removed, leaving the characteristic light green. Carbon dioxide or air containing carbon dioxide can be bubbled through the caustic to form a finely divided precipitate of sodium carbonate, which acts in the same way. An even simpler method is to use the sodium carbonate normally occurring in the liquor itself. Lime-soda caustic contains a relatively large quantity of sodium carbonate and sodium sulfate. Upon concentrating the liquor, these salts are precipitated in the form of coarse crystals. When the liquid has been concentrated to 50 per cent, these crystals are separated from the solution. On cooling this hot liquor, however, an additional amount of these salts is precipitated in the form of a finely divided sludge. Normally this sludge is separated from the liquor as expeditiously as possible and without any attempt to agitate the suspension. It has now been found that agitation of this sludge with the liquor for a considerable period of time will remove the brown coloring matter in a satisfactory and inexpensive manner.

All these methods leave the green component of the original color still in the liquor. The present invention involves as one feature the discovery that reduction by any convenient method will convert the soluble green coloring material in caustic solutions into the colloidal brown material, which can then be removed in the stated manner. Electrolytic reduction and the addition of metals which react with NaOH to give off hydrogen are both applicable in the conversion of the material giving the green color. To reduce electrolytically it is necessary only to pass a low voltage current through the caustic liquor. For reduction by metals, powdered zinc and aluminum may be added to the hot liquor, or more active metals, such as sodium or calcium, may also be added, preferably in the form of amalgams. Likewise the use of other reducing agents, such as sodium hydrosulfite is permissible.

After the reduction has proceeded sufficiently as evidenced by the loss of the greenish cast of the solution, the solution is treated in appropriate manner, for example with one of the finely divided inert materials heretofore mentioned to take up the colloidal material which imparts the brownish color. The suspended matter may then be removed in any convenient manner, i. e., by filtration, centrifugation, or settling.

Excellent results are obtained by merely cooling the solution after reduction, agitating it with the resulting sludge and then filtering. As a result both the original brown material and the brown material formed through treatment of the solution with a reducing agent to eliminate the green color may be removed at a single operation. Of course, treatment of the solution to remove the original coloring material may precede reduction if desired.

The effects of agitating a solution of caustic with a finely divided material, treating a solution of caustic with a reducing agent, and treating a caustic solution with a reducing agent and then removing the brown colloidal material by treatment with a finely divided material are illustrated by the following examples:

1. A 50% liquor was agitated for three hours with powdered alpha-cellulose. On removal of the cellulose, the deep yellow color due to the soluble material leached from the cellulose was destroyed by oxidation with sodium peroxide. A pale green color was left in the liquor, the brown color having been removed.

2. Hot 50% caustic coming from an evaporator was cooled and agitated for several hours with the sodium carbonate—sodium sulfate sludge formed by the cooling. The liquor lost its original brown color and was left with a light green color.

3. A 50% caustic liquor was treated with sodium amalgam to the extent of 0.1% Na on the weight of the liquor. The green tinge of the original liquor was removed, leaving a slightly deeper brown color. The brown color could readily be removed by treatment with a finely divided material.

4. A caustic liquor was heated to 90 deg. C. and 0.1% sodium hydrosulfite added. The liquor was made browner than before. Upon treatment with finely divided material, this color was also removed.

5. Hot 50% liquor coming from an evaporator was treated with 0.005% Zn in the form of zinc dust. After five minutes the liquor was allowed to cool, and was agitated with the sludge that formed on cooling. After several hours of agitation, the liquor on filtration proved to be of an excellent almost water-white color, which color was permanently retained.

Any zinc hydroxide precipitated by the reaction tends to absorb the colloidal material in the caustic and is a benefit rather than a detriment.

It is to be understood that we are not limited to the examples cited or by any theories as to the nature or relation of the colors dealt with, or in the choice of a reducing agent.

What we claim is:

A process of preparing a water white solution of sodium hydroxide which comprises reacting an aqueous solution of sodium carbonate with lime to form a solution of sodium hydroxide containing manganic coloring matter of green tint, treating said solution of sodium hydroxide with sufficient zinc to substantially completely remove the green coloration, whereby said manganic coloring matter is converted into a solid which is dispersed throughout the solution, and subsequently introducing an adsorbent to remove said solid.

BRAZIER K. BEECHER.
WILLIAM F. WALDECK.